US010445294B2

(12) United States Patent
Diederich et al.

(10) Patent No.: US 10,445,294 B2
(45) Date of Patent: Oct. 15, 2019

(54) SHARED SCAN OUTPUT IN INCREMENTAL DATA ANALYSIS SYSTEMS

(71) Applicant: International Business Machines Corporation, Armonk, NY (US)

(72) Inventors: Michael Diederich, Mainz (DE); Itzhack Goldberg, Hadera (IL); Erik Rueger, Ockenheim (DE); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 14/636,221

(22) Filed: Mar. 3, 2015

(65) Prior Publication Data

US 2016/0259809 A1 Sep. 8, 2016

(51) Int. Cl.
*G06F 16/00* (2019.01)
*G06F 16/178* (2019.01)
*G06F 11/14* (2006.01)

(52) U.S. Cl.
CPC ........ *G06F 16/178* (2019.01); *G06F 11/1451* (2013.01)

(58) Field of Classification Search
CPC .......... G06F 17/30174; G06F 11/1451; G06F 16/178
See application file for complete search history.

(56) References Cited

U.S. PATENT DOCUMENTS

| 6,665,669 | B2 | 12/2003 | Han et al. |
| 6,823,348 | B2 | 11/2004 | Benayoun et al. |
| 6,904,424 | B1 | 6/2005 | Gusler et al. |
| 7,783,615 | B1 | 8/2010 | Compton et al. |
| 7,962,779 | B2 | 6/2011 | Patel et al. |
| 9,430,331 | B1* | 8/2016 | Basov ................. G06F 11/1451 |
| 2006/0004890 | A1 | 1/2006 | Semple et al. |
| 2006/0230081 | A1* | 10/2006 | Craswell ............ G06F 11/1451 |
| 2009/0094293 | A1* | 4/2009 | Chernega ........... G06F 11/0727 |
| 2011/0276821 | A1* | 11/2011 | Gudlavenkatasiva ...... G06F 11/0751 714/3 |

(Continued)

OTHER PUBLICATIONS

Liu et al., "SmartScan: Efficient Metadata Crawl for Storage Management Metadata Querying in Large File Systems", CMU-PDL-10-112, Oct. 2010, pp. 1-17, Parallel Data Laboratory, Carnegie Mellon University, Pittsburgh, PA 15213-3890.

(Continued)

*Primary Examiner* — Sherief Badawi
*Assistant Examiner* — Lahcen Ennaji
(74) *Attorney, Agent, or Firm* — Anthony M. Pallone (57) ABSTRACT

Solutions are provided that use shared scan phases and scan output for various file-level incremental data analysis systems. In one embodiment, a shared scan phase is initiated for a plurality of files in a file system. During the shared scan phase, one or more rules are applied to the files in the file system to identify files on which to perform one or more operations. Shared scan output is created that includes information describing the identified files and operations to be performed on the identified files. Embodiments of the present invention can reduce the amount of time and computing resources that would otherwise be consumed by performing separate walkthroughs of a file system during separate scan phases.

15 Claims, 4 Drawing Sheets

(56) References Cited

U.S. PATENT DOCUMENTS

| | | | | |
|---|---|---|---|---|
| 2013/0305045 A1* | 11/2013 | Potekhin | ............ | H04L 67/2847 |
| | | | | 713/165 |
| 2014/0101111 A1 | 4/2014 | Sengupta et al. | | |
| 2014/0181441 A1* | 6/2014 | Kottomtharayil | ... | G06F 11/1458 |
| | | | | 711/162 |
| 2015/0112947 A1* | 4/2015 | Malin | ............... | G06F 17/30348 |
| | | | | 707/665 |
| 2015/0242284 A1* | 8/2015 | Ignatius | ............. | G06F 11/1448 |
| | | | | 707/641 |
| 2016/0019206 A1* | 1/2016 | Mysur | ................ | G06F 17/3007 |
| | | | | 707/825 |

OTHER PUBLICATIONS

Siemens and Carstens, Juergen, "Tilting X-ray Tube with Flexible Anodal Angle", An IP.com Prior Art Database Technical Disclosure, Original Publication Date: May 19, 2011, IP.com No. 000207195, IP.com Electronic Publication: May 19, 2011, Copyright: Siemens AG 2011, pp. 1-3, <http://null/IPCOM/000207195>.

* cited by examiner

SHARED SCAN OUTPUT IN INCREMENTAL DATA ANALYSIS SYSTEMS

BACKGROUND OF THE INVENTION

The present invention relates generally to the field of incremental data analysis systems, and more particularly to using a shared scan output in file-level incremental data analysis systems.

File-level incremental data analysis systems, such as file-level backup and replication systems, use a scan phase to identify candidate files on which to perform one or more operations (e.g., backup, replication, deletion, etc.). Each incremental data analysis system typically performs a separate scan phase, in which it walks through a data tree of the file system to analyze each file and generate scan output. Such scan phases can consume large amounts of time and computing resources walking through each file in a data tree, especially as the size of the data to be scanned increases.

SUMMARY

Embodiments of the present invention provide methods, systems, and computer program products for creating shared scan output for file-level incremental data analysis processes. In one embodiment, a method is provided comprising: initiating, by one or more computer processors, a shared scan phase for a plurality of files in a file system; during the shared scan phase, applying, by one or more computer processors, one or more rules to each of the plurality of files in the file system to identify files on which to perform one or more operations; and creating, by one or more computer processors, shared scan output that includes information describing the identified files and the one or more operations to be performed on the identified files.

DETAILED DESCRIPTION

Embodiments of the present invention recognize that existing file-level incremental data analysis systems can employ redundant scan phases and scan output results. For example, in typical file-level backup and replication systems, a scan of files in a file system is performed to identify files for backup, and a separate scan of the files in the file system is performed to identify files for replication. Embodiments of the present invention provide solutions that use a shared scan output for various file-level incremental data analysis systems, thereby reducing the amount of time and computing resources that would otherwise be consumed by performing separate walkthroughs of a file system during separate scan phases.

Figure 1:
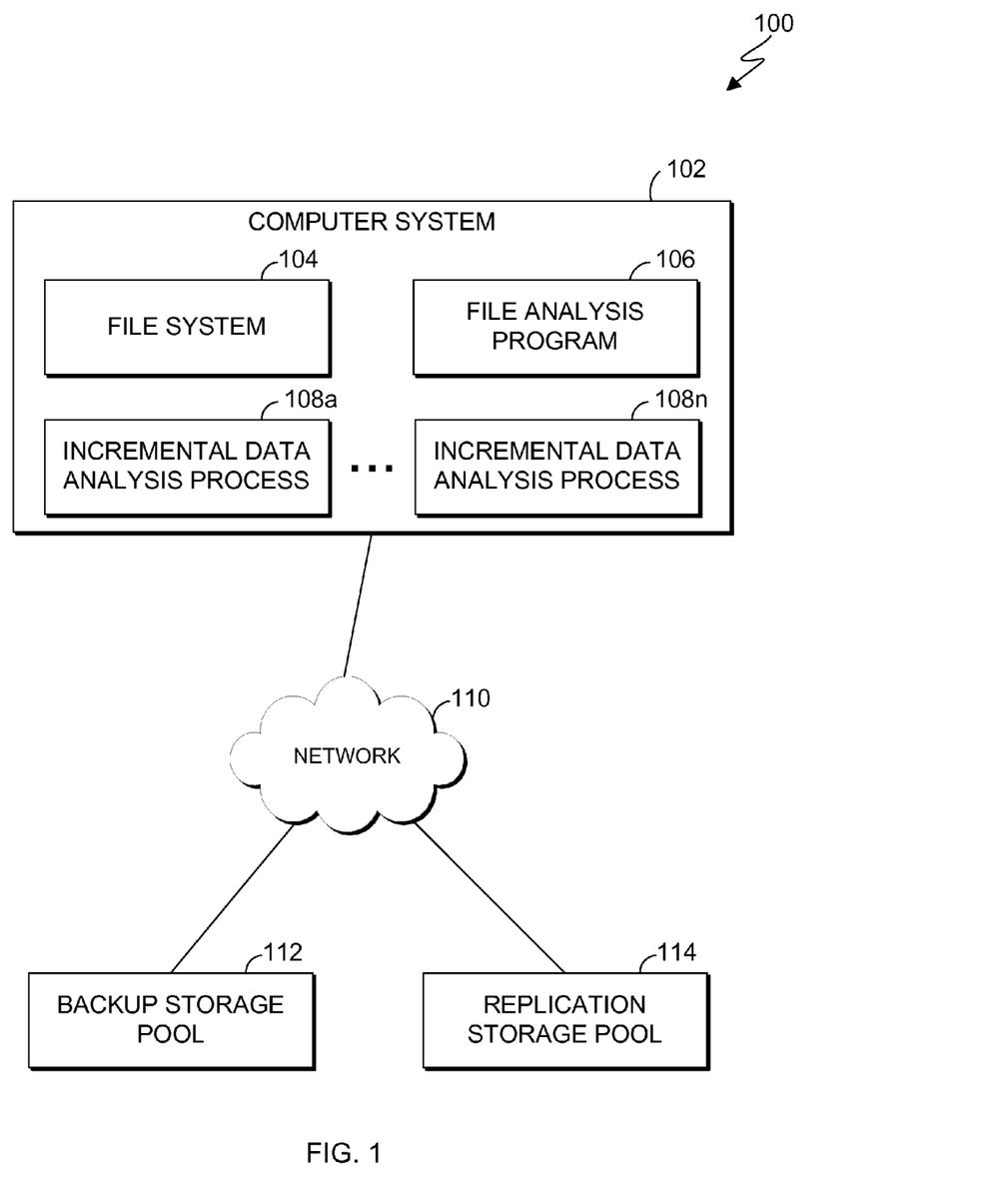
FIG. 1 is a block diagram of an incremental data analysis system, in accordance with an embodiment of the present invention.

FIG. 1 is a functional block diagram of incremental data analysis system 100, in accordance with an embodiment of the present invention. Incremental data analysis system 100 includes computer system 102, backup storage pool 112, and replication storage pool 114, all interconnected over network 110. Computer system 102 can be a desktop computer, laptop computer, specialized computer server, or any other computer system known in the art. In certain embodiments, computer system 102 represents a computer system utilizing clustered computers and components to act as a single pool of seamless resources when accessed through network 110. For example, such embodiments may be used in data center, cloud computing, storage area network (SAN), and network attached storage (NAS) applications. In certain embodiments, computer system 102 represents a virtual machine. In general, computer system 102 is representative of any electronic device, or combination of electronic devices, capable of executing machine-readable program instructions, as described in greater detail with regard to FIG. 4.

Computer system 102 includes file system 104, file analysis program 106, and incremental data analysis processes 108a-n. File system 104 can be implemented with any desired file system known in the art. File analysis program 106 performs file-level incremental data analysis operations for files stored on file system 104. As discussed in greater detail later in this specification, file analysis program 106 can perform a scan of file system 104 to produce shared scan output results that can be used by each of incremental data analysis processes 108a-n, thereby eliminating the need to perform separate, redundant scan phases in order to perform various incremental data analysis processes. File analysis program 106 can be implemented as one or more stand-alone programs or as a component (e.g., a module or plug-in) of other incremental data analysis software (e.g., backup and replication software).

Incremental data analysis processes 108a-n can include, for example, file-level backup processes, replication processes, delete processes, and modification processes. In general, incremental data analysis processes 108a-n can be any desired file-level data analysis process that can be performed on the files of file system 104, in accordance with embodiments of the present invention. In this embodiment, each of incremental data analysis processes 108a-n includes one or more specified rules that dictate which files to subject to operations and what those operations should be (e.g., backup, replication, delete, modifications, etc.).

Backup storage pool 112 represents an aggregation of physical storage resources to which files from file system 104 can be backed up over network 110 by one or more of incremental data analysis processes 108a-n. Similarly, replication storage pool 114 represents an aggregation of physical storage resources to which files from file system 104 can be replicated over network 110 by one or more of incremental data analysis processes 108a-n. Backup storage pool 112 and replication storage pool 114 can be implemented with any suitable storage media known in the art. For example, backup storage pool 112 and replication storage pool 114 can be implemented with tape libraries, optical libraries, one or more independent hard disk drives, or multiple hard disk drives in redundant arrays of independent disks (RAID). Furthermore, backup storage pool 112 and replication storage pool 114 can share physical storage resources.

Network 110 can be, for example, a local area network (LAN), a wide area network (WAN) such as the Internet, or a combination of the two, and include wired, wireless, or fiber optic connections. In general, network 110 can be any combination of connections and protocols that will support communications between computer system 102, backup storage pool 112, and replication storage pool 114, in accordance with a desired embodiment of the invention.

It should be understood that FIG. 1 depicts an illustrative incremental data analysis system 100, in accordance with an embodiment of the present invention. Incremental data analysis system 100 can include other computer systems and elements when implementing other embodiments of the present invention. For example, while FIG. 1 shows a single computer system 102, incremental data analysis system 100 can also include additional computer systems 102 that back up their respective data to backup storage pool 112 and replication storage pool 114. Similarly, in other embodiments, backup storage pool 112 and replication storage pool 114 can be omitted and/or other types of storage pools can be used.

Figure 2:
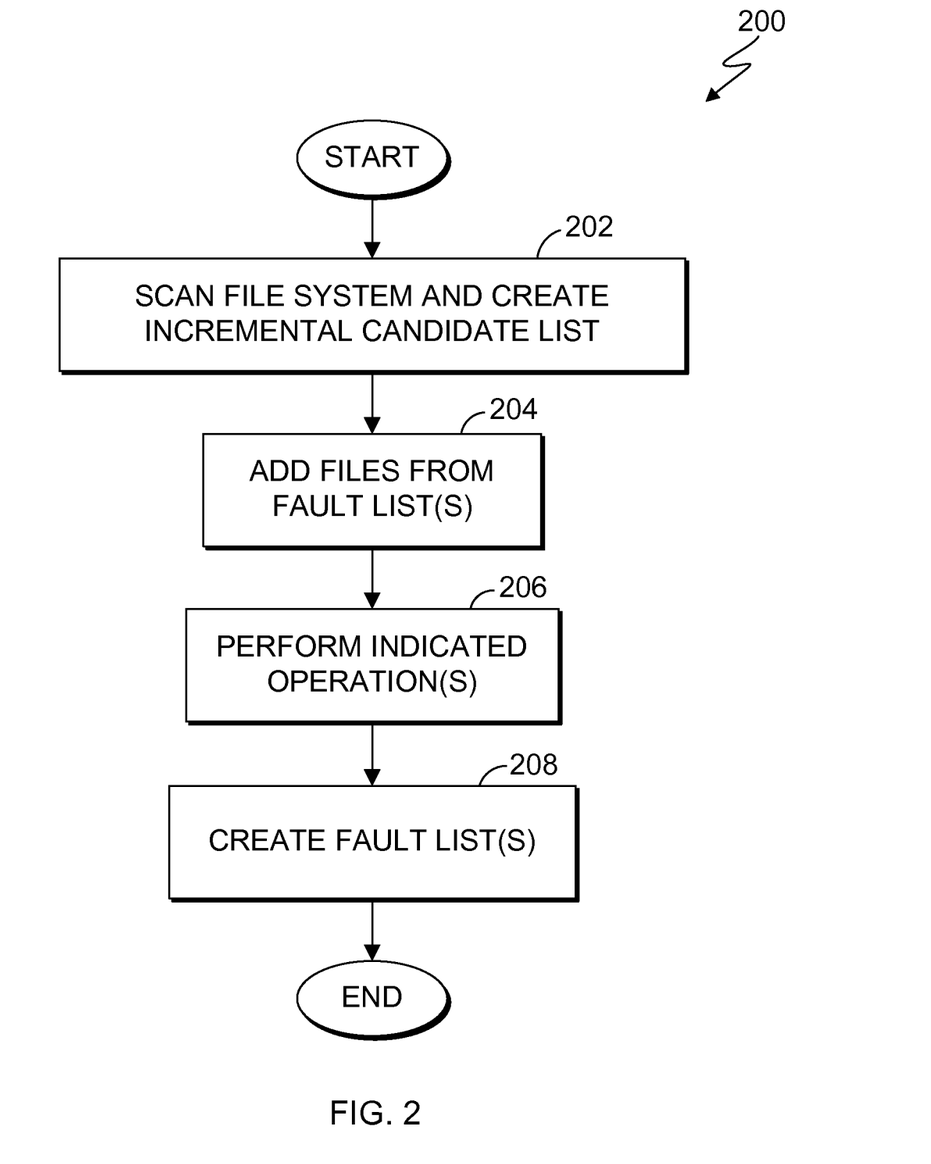
FIG. 2 is a flowchart illustrating operations for performing incremental data analysis of files, in accordance with an embodiment of the present invention.

FIG. 2 is a flowchart 200 illustrating operations for performing incremental data analysis of files, in accordance with an embodiment of the present invention.

File analysis program 106 scans file system 104 and creates an incremental candidate list of files (operation 202). In this embodiment, file analysis program 106 scans file system 104 (e.g., a data tree) file-by-file, and applies rules used by incremental data analysis processes 108a-n to identify files on which to perform one or more operations. Rules can be specified, for example, by a user and/or data protection policy, and can be based on various criteria, such as file location, file size, file creation date, file modification date, privileges, etc. For example, where incremental data analysis processes 108a-n include incremental file-level backup processes, replication processes, and delete processes, file analysis program 106 can apply backup rules (i.e., rules that specify which files to backup), replication rules (i.e., rules that specify which files to replicate), and delete rules (i.e., rules that specify which files to delete) to each file.

In this embodiment, file analysis program 106 creates a single incremental candidate list that includes information for each file identified for one or more operations by one or more of incremental data analysis processes 108a-n. For example, the incremental candidate list can comprise file location and size information for each candidate file, along with a flag or other marker indicating what operations should be performed on the candidate file (e.g., backup, replication, deletion, modification, etc.). In another embodiment, file analysis program 106 can create and maintain separate incremental candidate lists for each of the one or more incremental data analysis processes 108a-n. For example, file analysis program 106 may create an incremental candidate list for files to be backed up, a separate list for files to be replicated, a separate list for files to be deleted, and a separate list for files to be modified. In each of these embodiments, file analysis program 106 performs only a single scan of file system 104 (i.e., a single walkthrough of the data tree) that is shared for the purposes of both backup and replication. Operations for performing a shared scan phase are discussed in greater detail with regard to FIG. 3.

Files from one or more fault lists are added to the incremental candidate list (operation 204). In this embodiment, as discussed below, each of incremental data analysis processes 108a-n can identify and document failed files on which operations have not been successfully performed. For example, one or more of incremental data analysis processes 108a-n may identify failed files that were not properly backed up to backup storage pool 112, that were not properly replicated to replication storage pool 114, that were not properly deleted, and/or that were not properly modified. Each such incremental data analysis process 108a-n may determine whether to add such files to the incremental candidate list, and where to add such files to the incremental candidate list. For example, to help ensure that failed files are properly backed up, replicated, deleted, and/or modified, failed files can be recorded by respective incremental data analysis processes 108a-n in one or more fault lists (e.g., a fault backup list, a fault replication list, a fault deletion list, and a fault modification list) for addition to the top of the incremental candidate list. In this manner, the appropriate operations can again be performed for those failed files prior to performing operations on the remaining files in the incremental candidate list. Failed files can be added to the incremental candidate list by file analysis program 106 and/or by incremental data analysis processes 108a-n.

Incremental data analysis processes 108a-n perform one or more indicated operations on the files of the incremental candidate list (operation 206). In this embodiment, the appropriate one or more incremental data analysis processes 108a-n perform operations on the files, as indicated by flags associated with the files. For example, one or more of incremental data analysis processes 108a-n can copy all files in the incremental candidate list that are flagged for backup and/or replication, as well as failed files added to the incremental candidate list from a fault backup list and/or replication fault list (i.e., in operation 204), from the incremental candidate list to backup storage pool 112 and/or replication storage pool 114 via network 110. In another example, one or more of incremental data analysis processes 108a-n can delete from file system 104 all files in the incremental candidate list that are flagged for deletion, as well as failed files added to the incremental candidate list from a fault deletion list (i.e., in operation 206). In yet another example, one or more of incremental data analysis processes 108a-n can modify in file system 104 all files in the incremental candidate list that are flagged for modification, as well as failed files added to the incremental candidate list from a fault modification list (i.e., in operation 206)

Incremental data analysis processes 108a-n create one or more fault lists (operation 208). In this embodiment, fault lists include information identifying failed files for which an indicated operation was not properly performed or was not otherwise successful (i.e., in operation 206). For example, one or more of incremental data analysis processes 108a-n can create a fault backup list and a fault replication list, where the fault backup list includes information identifying failed files that were not were not successfully backed up to backup storage pool 112, and the fault replication list includes information identifying failed files that were not successfully replicated to replication storage pool 114. Similarly, one or more of incremental data analysis processes 108a-n can create a fault deletion list and a fault modification list, where the fault deletion list includes information identifying failed files that were not properly deleted from file system 104, and the fault modification list includes information identifying failed files that were not properly modified. For example, failed files can result when a disruption in network 110 prevents complete transfer of one or more files or instructions, or when files are transferred but their contents are corrupt. By identifying and adding failed files to the fault lists, incremental data analysis processes 108a-n can add failed files to the incremental candidate list for a subsequent operations. In this manner, the appropriate operations can ultimately be performed on failed files, even where such files may not have changed between incremental data analysis processes and would not otherwise be detected for subsequent incremental data analysis processes (e.g., a file has not changed between incremental backup processes and would, therefore, not otherwise be detected for backup).

Figure 3:
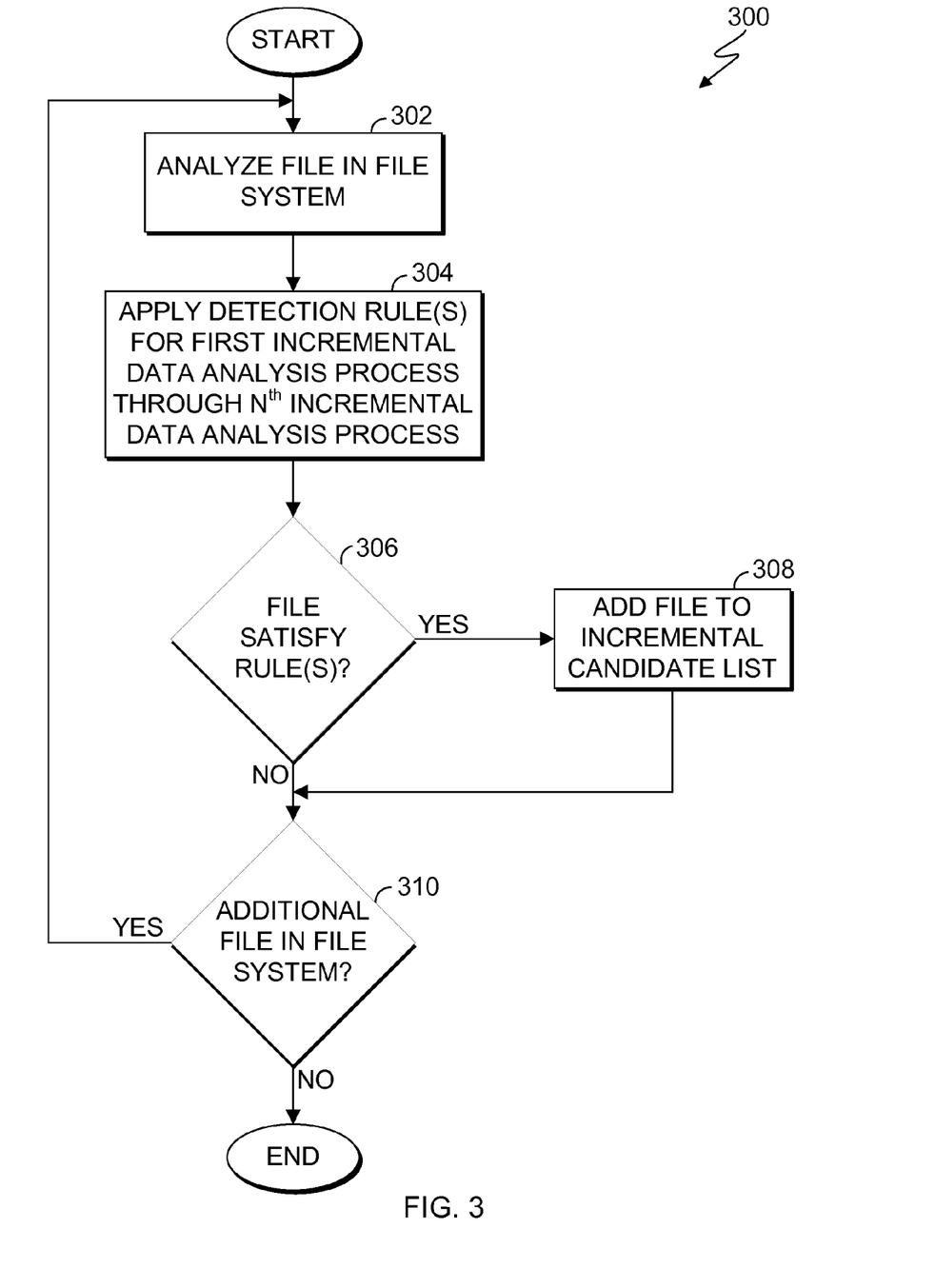
FIG. 3 is a flowchart illustrating operations for performing a shared scan phase, in accordance with an embodiment.

FIG. 3 is a flowchart 300 illustrating operations for performing a shared scan phase, in accordance with an embodiment. The operations of FIG. 3 can be performed, for example, at operation 202 of FIG. 2.

File analysis program 106 analyzes a file in file system 104 (operation 302). In this embodiment, file system 104 is represented as data tree structure, and file analysis program 106 crawls through the data tree structure file-by-file.

File analysis program 106 applies one or more detection rules used by incremental data analysis processes 108a-n (operation 304). As previously discussed, in this embodiment, the one or more detection rules (e.g., user-specified and/or policy-specified rules) determine files on which to perform one or more operations.

File analysis program 106 determines whether the analyzed file satisfies one or more of the applied detection rules (operation 306). If the analyzed file satisfies one or more of the applied detection rules (operation 306; YES branch), then file analysis program 106 adds the analyzed file to the incremental candidate list and flags the analyzed file to indicate the appropriate operation to be performed on the analyzed file (operation 308). For example, if the analyzed file satisfies a detection rule for a backup process, file analysis program 106 adds the analyzed file to the incremental candidate list and flags the analyzed file for backup to backup storage pool 112; if the analyzed file satisfies a detection rule for a replication process, file analysis program 106 adds the analyzed file to the incremental candidate list and flags the analyzed file for replication to replication storage pool 114; if the analyzed file satisfies a detection rule for a deletion process, file analysis program 106 adds the analyzed file to the incremental candidate list and flags the analyzed file for deletion from file system 104; if the analyzed file satisfies a detection rule for a modification process, file analysis program 106 adds the analyzed file to the incremental candidate list and flags the analyzed file for modification. If the analyzed file is already present in the incremental candidate list and flagged for an operation, file analysis program 106 can add additional flags to the existing entry, rather than create an additional entry for the same analyzed file. In other embodiments, as previously discussed, separate lists can be maintained for different incremental data analysis processes 108a-n.

After adding the analyzed file to the incremental candidate list (operation 308), or if the analyzed file does not satisfy one or more of the applied detection rules (operation 306; NO branch), file analysis program 106 determines whether there is an additional file in file system 104 that has not yet been analyzed in the scan phase (operation 310). If file analysis program 106 determines that there is an additional file (operation 310; YES branch), then file analysis program 106 continues to scan file system 104 and analyzes a next file in file system 104. If file analysis program 106 determines that there are no additional files (operation 310; NO branch), then the scan phase ends.

Accordingly, by performing operations of FIGS. 2 and 3, file analysis program 106 performs a single, shared scan phase of file system 104 and generates shared scan output that can be used for incremental data analysis processes 108a-n and their respective operations. In this manner, embodiments of the present invention can improve the speed and efficiency with which file-level incremental data analysis processes are performed, particularly as file system sizes are increased, and can, therefore, be used to improve scalability of such incremental data analysis systems.

Figure 4:
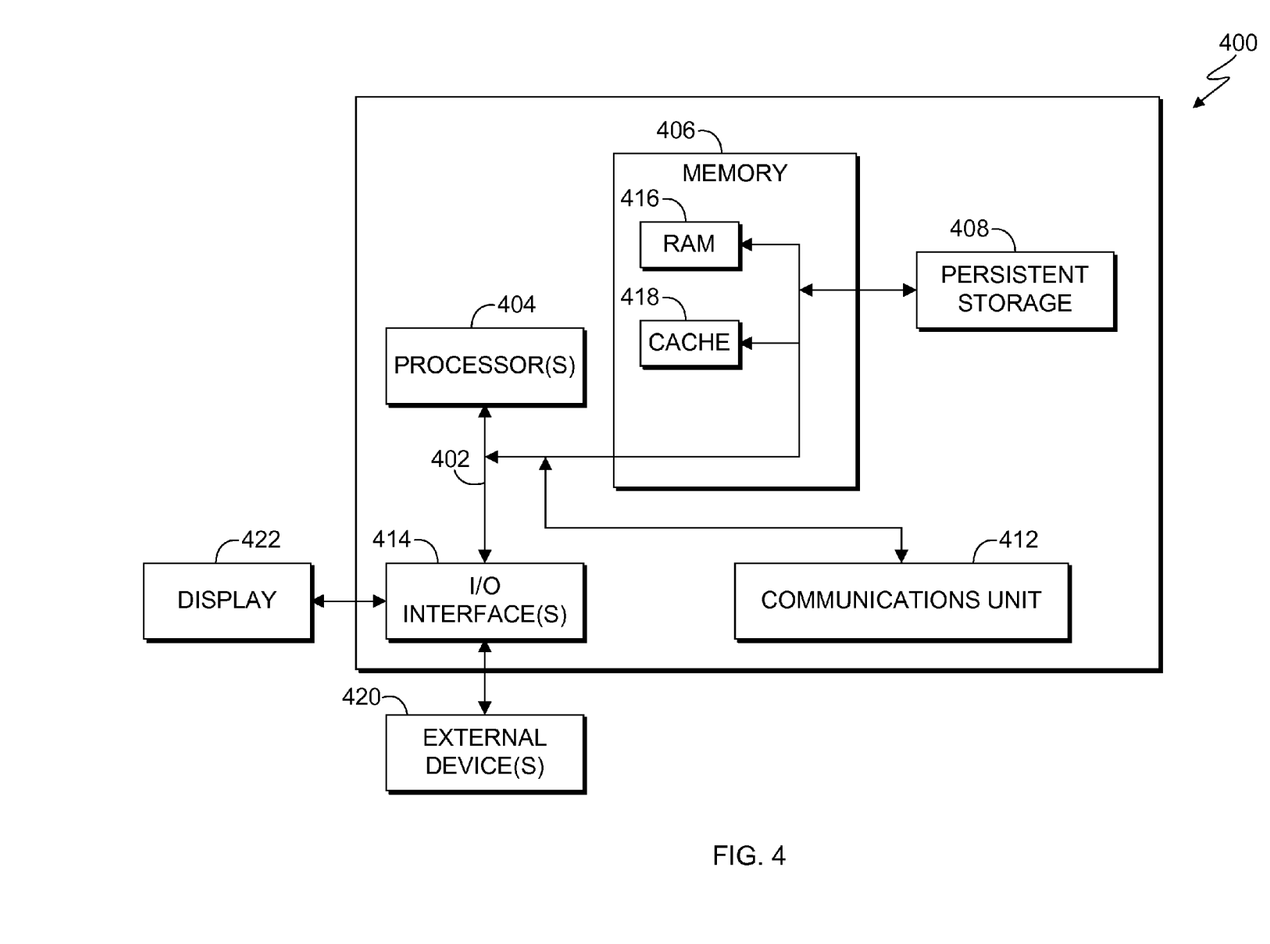
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software and data (e.g., file system 104, file analysis program 106, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 110). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can include, for example, copper wires, optical fibers, wireless transmission, routers, firewalls, switches, gateway computers and/or edge servers. Software and data used to practice embodiments of the present invention can be downloaded to computer system 102 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating scan output for file-level incremental data analysis processes, the method comprising:
   initiating, by one or more computer processors, a scan phase for a plurality of files in a data tree structure, wherein the scan phase comprises a single file-by-file walkthrough of the data tree structure;
   during the scan phase, applying, by one or more computer processors, one or more rules to each of the plurality of files in the data tree structure to identify files on which to perform one or more operations by the one or more file-level incremental data analysis processes, wherein the one or more rules are defined by data management policies of the one or more file-level incremental data analysis processes;
   creating, by one or more computer processors, a scan output list that includes information describing the identified files and the one or more operations to be performed on the identified files, wherein the scan output list is shared among the one or more file-level incremental data analysis processes for use in implementing their respective one or more operations;
   performing, by one or more computer processors, the one or more operations on the identified files within the scan output list in a top to bottom order;
   creating, by one or more computer processors, one or more fault lists comprising failed files, wherein the failed files comprise the identified files on which the one or more operations have not been successfully performed by the one or more file-level incremental data analysis processes; and
   adding, by one or more computer processors, the failed files from the one or more fault lists to the top of a subsequent scan output list comprising subsequently identified files.

2. The method of claim 1, wherein the scan output list comprises file location information for each of the identified files, along with flags indicating operations that should be performed on each of the identified files by the one or more file-level incremental data analysis processes.

3. The method of claim 1, wherein the one or more operations comprise one or more of: a backup operation, a replication operation, a delete operation, and a modification operation.

4. The method of claim 3, further comprising:
   copying, by one or more computer processors, one or more of the identified files to a backup storage pool; and
   copying, by one or more computer processors, one or more of the identified files to a replication storage pool.

5. The method of claim 3, further comprising:
   deleting, by one or more computer processors, one or more of the identified files from the data tree structure.

6. A computer program product for creating scan output for file-level incremental data analysis processes, the computer program product comprising:
   one or more computer readable storage media and program instructions stored on the one or more computer readable storage media, the program instructions comprising:
      program instructions to initiate a scan phase for a plurality of files in a data tree structure, wherein the scan phase comprises a single walkthrough, file-by-file, of the data tree structure;
      program instructions to, during the scan phase, apply one or more rules to each of the plurality of files in the data tree structure to identify files on which to perform one or more operations by the one or more file-level incremental data analysis processes, wherein the one or more rules are defined by data management policies of the one or more file-level incremental data analysis processes;
      program instructions to create a scan output list that includes information describing the identified files and the one or more operations to be performed on the identified files, wherein the scan output list is shared among the one or more file-level incremental data analysis processes for use in implementing their respective one or more operations;
      program instructions to perform the one or more operations on the identified files within the scan output list in a top to bottom order;
      program instructions to create one or more fault lists comprising failed files, wherein the failed files comprise the identified files on which the one or more operations have not been successfully performed by the one or more file-level incremental data analysis processes; and
      program instructions to add the failed files from the one or more fault lists to the top of a subsequent scan output list comprising subsequently identified files.

7. The computer program product of claim 6, wherein the scan output list comprises file location information for each of the identified files, along with flags indicating operations that should be performed on each of the identified files by the one or more file-level incremental data analysis processes.

8. The computer program product of claim 6, wherein the one or more operations comprise one or more of: a backup operation, a replication operation, a delete operation, and a modification operation.

9. The computer program product of claim 8, wherein the program instructions stored on the one or more computer readable storage media further comprise:

program instructions to copy one or more of the identified files to a backup storage pool; and program instructions to copy one or more of the identified files to a replication storage pool.

10. The computer program product of claim 8, wherein the program instructions stored on the one or more computer readable storage media further comprise:

program instructions to delete one or more of the identified files from the data tree structure.

11. A computer system for creating scan output for file-level incremental data analysis processes, the computer system comprising:

one or more computer processors;

one or more computer readable storage media; and program instructions stored on the one or more computer readable storage media for execution by at least one of the one or more processors, the program instructions comprising:

program instructions to initiate a scan phase for a plurality of files in a data tree structure, wherein the scan phase comprises a single walkthrough, file-by-file, of the data tree structure;

program instructions to, during the scan phase, apply one or more rules to each of the plurality of files in the data tree structure to identify files on which to perform one or more operations by the one or more file-level incremental data analysis processes, wherein the one or more rules are defined by data management policies of the one or more file-level incremental data analysis processes;

program instructions to create a scan output list that includes information describing the identified files and the one or more operations to be performed on the identified files, wherein the scan output list is shared among the one or more file-level incremental data analysis processes for use in implementing their respective one or more operations;

program instructions to perform the one or more operations on the identified files within the scan output list in a top to bottom order;

program instructions to create one or more fault lists comprising failed files, wherein the failed files comprise the identified files on which the one or more operations have not been successfully performed by the one or more file-level incremental data analysis processes; and program instructions to add the failed files from the one or more fault lists to the top of a subsequent scan output list comprising subsequently identified files.

12. The computer system of claim 11, wherein the scan output list comprises file location information for each of the identified files, along with flags indicating operations that should be performed on each of the identified files by the one or more file-level incremental data analysis processes.

13. The computer system of claim 11, wherein the one or more operations comprise one or more of: a backup operation, a replication operation, a delete operation, and a modification operation.

14. The computer system of claim 13, wherein the program instructions stored on the one or more computer readable storage media further comprise:

program instructions to copy one or more of the identified files to a backup storage pool; and program instructions to copy one or more of the identified files to a replication storage pool.

15. The method of claim 1, further comprising:

creating, by one or more computer processors, separate scan output lists for each of the one or more file-level incremental data analysis processes, wherein a separate scan output list includes information describing the identified files and the one or more operations to be performed on the identified files specific to a single file-level incremental data analysis process.

\* \* \* \* \*